(12) United States Patent
Rouphael

(10) Patent No.: US 6,782,738 B2
(45) Date of Patent: Aug. 31, 2004

(54) METHOD AND COMPUTER FOR DETERMINING A SETTING FOR CORRECT OPERATION OF AN INTERNAL COMBUSTION ENGINE

(75) Inventor: Roger Rouphael, L'Union (FR)

(73) Assignee: Siemens VDO Automotive, Toulouse Cedex (FR)

( * ) Notice: Subject to any disclaimer, the term of this patent is extended or adjusted under 35 U.S.C. 154(b) by 0 days.

(21) Appl. No.: 10/396,496

(22) Filed: Mar. 26, 2003

(65) Prior Publication Data

US 2003/0182995 A1 Oct. 2, 2003

(30) Foreign Application Priority Data

Mar. 27, 2002 (FR) .......................................... 02 03819

(51) Int. Cl.[7] .......................................... G01M 15/00
(52) U.S. Cl. .................................................. 73/118.2
(58) Field of Search ....................... 73/118.1; 123/399; 60/605.2

(56) References Cited

U.S. PATENT DOCUMENTS

| | | | | |
|---|---|---|---|---|
| 4,860,222 A | * | 8/1989 | Schmidt et al. ............. | 364/550 |
| 5,497,329 A | * | 3/1996 | Tang ...................... | 364/431.05 |
| 5,555,870 A | * | 9/1996 | Asano ...................... | 123/480 |
| 5,718,203 A | * | 2/1998 | Shimada et al. ............. | 123/425 |
| 5,974,870 A | * | 11/1999 | Treinies et al. ............. | 73/118.2 |
| 6,282,485 B1 | * | 8/2001 | Kotwicki et al. ........... | 701/104 |

FOREIGN PATENT DOCUMENTS

| | | |
|---|---|---|
| DE | 197 53 873 A1 | 6/1999 |
| WO | WO 01/83970 | 11/2001 |

OTHER PUBLICATIONS

XP00010213653A, Hendricks et al., "Alternative Observers for SI Engine Air/Fuel Ratio Control", 1996, pp. 2806–2811.

* cited by examiner

*Primary Examiner*—Edward Lefkowitz
*Assistant Examiner*—Octavia Davis
(74) *Attorney, Agent, or Firm*—Young & Thompson

(57) ABSTRACT

The operation of an internal combustion engine as a function of the air pressure in at least one engine air inlet manifold (5, 7), in which a campaign of bench tests is carried out on the engine in order to establish a law governing the evolution of the air flow rate MAF of the air entering a cylinder (1) of this engine, as a function of the admission pressure MAP taken from the inlet manifold, this being done at various engine speeds and then, on an operating engine, the air pressure is measured in the engine inlet manifold, a corresponding air pressure MAP value is supplied to a computer (27) that is also supplied the engine speed corresponding to it, and, from this, the air flow rate is deduced as a function of the established evolution law.

15 Claims, 1 Drawing Sheet

METHOD AND COMPUTER FOR DETERMINING A SETTING FOR CORRECT OPERATION OF AN INTERNAL COMBUSTION ENGINE

FIELD OF THE INVENTION

The invention relates to a method for determining the amount of air entering a cylinder of an internal combustion engine or series of engines as a function of the air pressure in at least one engine inlet manifold.

BACKGROUND OF THE INVENTION

One objective is to determine the air mass flow rate of air let into the cylinder to which the aforesaid inlet manifold is connected, in order in particular to define the correct air/fuel mixture, at the same time minimizing emissions of polluting gases.

In this context, one problem that the invention addresses is concerned with obtaining a more appropriate air flow rate to the cylinder(s), using for that a simple, effective but functional method.

To do this, it is already known practice to proceed as follows:

a campaign of bench tests is carried out on the engine or on an engine of the series in order to establish a law governing the evolution of the air mass flow rate MAF entering a cylinder of the engine connected to said inlet manifold, as a function of the admission pressure MAP in this inlet manifold, this being done for various engine speeds, then, on an operating series engine:
the air pressure in said engine inlet manifold is measured,
a corresponding air pressure MAP value is supplied to a computer which is also supplied with the engine speed corresponding to it,
and, from this, said air mass flow rate is deduced as a function of the established evolution law.

However, it has been found that, at least for some types of engine, there is a discrepancy between the air flow rate value supplied by the aforesaid computer as a function of said evolution law and the actual value of this flow rate, at least for certain values of the admission pressure (pressure MAP) in the inlet manifold.

It will now be noted that this discrepancy occurs at least on "small engines", namely gasoline engines, in which the volumes of the inlet manifold(s) are small, and in particular smaller than the cylinder capacity of the engine. It has even been found that a sector to which the solution of the invention more particularly applies is that in which the following relationship is satisfied:

$$\frac{V_c \times N_c}{C} < 3.5$$

with $V_c$: volume of the inlet manifold or of the manifold "plenum" where the pressure MAP measurements are taken,
$N_c$: number of engine cylinders
C: cylinder capacity of the engine.

It will be noted for all practical purposes that the term "plenum" of an inlet manifold is applied to a chamber interposed on this manifold between the member that regulates the admission air flow rate (typically the butterfly valve) and the inlet valve of the cylinder to which said manifold is connected.

Particularly with this type of engine (although other engines may be affected), a significant feature of the invention therefore anticipates, in order to provide a solution to the aforesaid discrepancies, that, at least for certain values of the pressure MAP, the computer will be supplied, by way of evolution law, with a corrected model. However, given that test campaigns have demonstrated that at least in many cases there is a pressure MAP threshold beyond which the air flow rate MAF no longer evolves as a substantially linear function of the pressure MAP, for various engine rotational speeds N, this being particularly true of engines of small cylinder capacity, the invention proposes, in order for the onboard computer to be able to supply the conditions of functional stoechiometric air/fuel mixture, that:

for a series of engine speeds N in succession, and up to a certain pressure MAP value, said evolution law is established by modeling it using corresponding series of refined straight lines $$y = ax - b, \text{with} \tag{a}$$

y = MAF
x = MAP
$a = a_1 \times N$ ($a_1$ is a constant)
$b = a_2 \times N$ ($a_2$ is a constant)
and, from an pressure MAP threshold onward, a corrected model is applied to take account of a difference between the actual value of the flow rate MAF and its value according to the model (a), beyond the threshold, to do that replacing b with b', with:

$$b' = f(N, MAP^2, MAP^3) + a_3 \times N$$

so that the evolution in the flow rate MAF becomes a function not only of the engine speed N but also of the evolution to the second and third power of the pressure MAP.

In addition, for a first category of engines, it is even advisable, still in order to take account of the aforesaid discrepancies, that the procedure be as follows:

said law governing the evolution of the air flow rate as a function of the pressure in the inlet manifold is established by considering that:

$$MAF = S_1 \times MAP - Ofs(N)$$

with MAF: air flow rate of the air entering the cylinder,
$S_1$: constant,
N: engine speed,
MAP: air pressure in the inlet manifold connected to the cylinder in question,
Ofs (N): value, at a given engine speed N, of the flow rate MAF at zero pressure MAP,
and, at least for said certain pressure MAP values, a correction is introduced into the value of the flow rate MAF using the corrected model so as to take account of a difference there is between the actual value of the flow rate MAF, at a determined value of the pressure MAP and a given engine speed N, and the one supplied by said established evolution law, this correction being determined from measurements made during the bench test.

Because, on certain engines tested, the evolution in the air flow rate MAF as a function of the admission air pressure MAP, at various engine speeds N, depart markedly from a straight line under certain engine operating conditions, it will be noted that in actual fact it is possible to envisage applying said corrected model to all the pressure MAP values.

In order to obtain the most precise value of the air flow rate MAF, it is, for all that, advised in the invention to supply the computer, at least for certain pressure MAP values, by way of a corrected model, that established according to the law:

$$MAF[(S_0 \times MAP^3) - (S_1 \times MAP^2) + (S_3 \times MAP^2)] \times N - Ofs(N) \text{with:}$$

$S_0$, $S_1$, $S_3$: constants,

Ofs (N): value of the air flow rate MAF, at zero pressure MAP and at the engine speed N.

One problem with which the invention is also faced is that of the best way of taking account, if necessary, of the pressure MAP threshold beyond which the discrepancy in the evolution law MAF=f(MAP) is considered to degrade the results.

SUMMARY OF THE INVENTION

The solution proposed by the invention is to take account of an averaged filtered pressure MAP. Indeed it is found that the mean of the air pressure MAP is a continuous function of the position of the member that regulates the air flow rate in the inlet manifold (typically the position of the butterfly valve) and of the engine rotational speed.

In fact, it is even advised to define the admission air pressure value (threshold) beyond which the corrected model applies, taking the following into consideration:

said filtered averaged pressure values, and instantaneous admission air pressure values measured more or less upon opening of the inlet valve inserted between the cylinder in question and the inlet manifold in question.

In series engines in operation, the filtered averaged measurements of pressure MAP will be supplied to the computer for real-time air/fuel metering. It will be noted that, particularly in the case of the aforesaid "small engines", the sampling will be performed asynchronously with regards to the rotational cycle of the engine.

Apart from the foregoing, the invention also relates to an electronic computer installed in an internal combustion engine to determine a setting for correct operation of this engine, one feature of the computer being, according to the invention, that in this computer is modeled the law governing the evolution of the air flow rate MAF as a function of the admission pressure MAP, as follows:

for a series of engine speeds N in succession, and up to a certain pressure MAP value, there is established in the computer the law governing the evolution of the air flow rate MAF entering a cylinder (1) of the engine connected to an inlet manifold (5, 7) through which at least air passes, as a function of the air pressure MAP taken from said inlet manifold, by modeling it with a corresponding series of refined straight lines $$y=ax-b,\text{with:} \quad (a)$$

y=MAF x=MAP a=$a_1 \times N$ ($a_1$ is a constant)

b=$a_2 \times N$ ($a_2$ is a constant)

and, from a pressure MAP threshold onward, a corrected model is applied to take account of a difference between the actual value of the flow rate MAF and its value according to the model (a), beyond the threshold, to do that replacing b with b', with:

$$b'=f(N, MAP^2, MAP^3)+a_3 \times N$$

so that the evolution in the flow rate MAF becomes a function not only of the engine speed N but also of the evolution to the second and third power of the pressure MAP.

BRIEF DESCRIPTION OF THE DRAWINGS

A more detailed description of the invention will now be given with reference to the appended drawings in which.

DETAILED DESCRIPTION OF THE INVENTION

Typically, it was known at the date of the invention that, for a number of internal combustion engines (particularly indirect-injection gasoline engines) and under standard atmospheric pressure and temperature conditions in the engine cylinder(s), the air flow rate MAF of air let into this cylinder may be modeled using the following formula:

$$MAF = S_1 \times N \times MAP - Ofs(N), \text{with} \qquad (1)$$

MAF: flow rate of air entering the cylinder at a steady engine speed $S_1$: constant N: engine speed MAP: pressure in the (one of the) inlet manifold(s) connected to the cylinder, Ofs(N): non-zero constant corresponding to the value of the air flow rate MAF at the zero value of pressure MAP and at the engine speed N.

Figure 1:
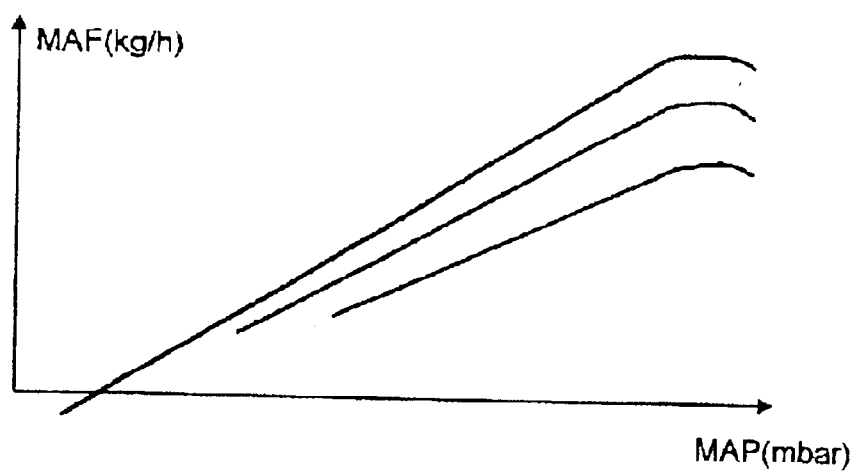
FIG. 1 shows, for three different engine speeds, an evolution in flow rate MAF as a function of an admission air pressure MAP, this being for an indirect-injection gasoline engine with a cylinder capacity of two liters.

It has been possible to draw a series of curves as illustrated in FIG. 1 from such an evolution law.

The three curves illustrated each correspond to a different engine speed from the other two.

It can be seen that, in this case, at the right-hand end of each of the curves, for high air pressures MAP (of the order of 1000 millibar), each curve begins to diverge from the refined straight line that represents it over the remainder of the range of pressure MAP values.

In point of fact, it was found that the discrepancy could be far greater and become detrimental to correct operation of the engine, particularly by disrupting the air/fuel mixture metering As already stated, this was found to be the case in particular on "small cylinder capacity" engines where $$\frac{V_c}{C} < 1.$$

On this type of engine in particular (which are typically indirect-injection gasoline engines), it was found that, because of the small volume of the inlet manifolds and/or the small cylinder capacity, the pressure MAP values are clipped to atmospheric pressure when the inlet valve closes.

Figure 2:
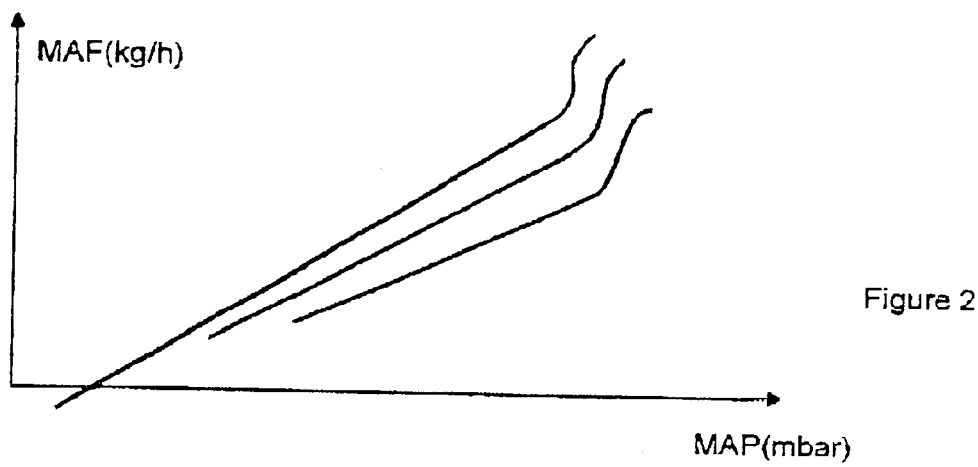
FIG. 2 shows three curves showing, for three different engine speeds, an evolution in flow rate MAF as a function of pressure MAP, this being for a 125-cc four-stroke gasoline engine.

Furthermore, FIG. 2 depicts, for a 125-cc indirect-injection single-cylinder four-stroke gasoline engine, a series of curves showing the evolution of the air flow rate MAF as a function of the pressure MAP, and it is indeed found that, in the right-hand part of the curves, there is a discrepancy that is even more pronounced than that one in FIG. 1, this discrepancy occurring at pressures MAP that differ according to the engine speed.

This is why in the invention a choice has been made to supply the computer with a modeled law governing the evolution of the air flow rate MAF, taking account of the evolution to the second and/or third power of the pressure MAP at various engine speeds N.

Figure 3:
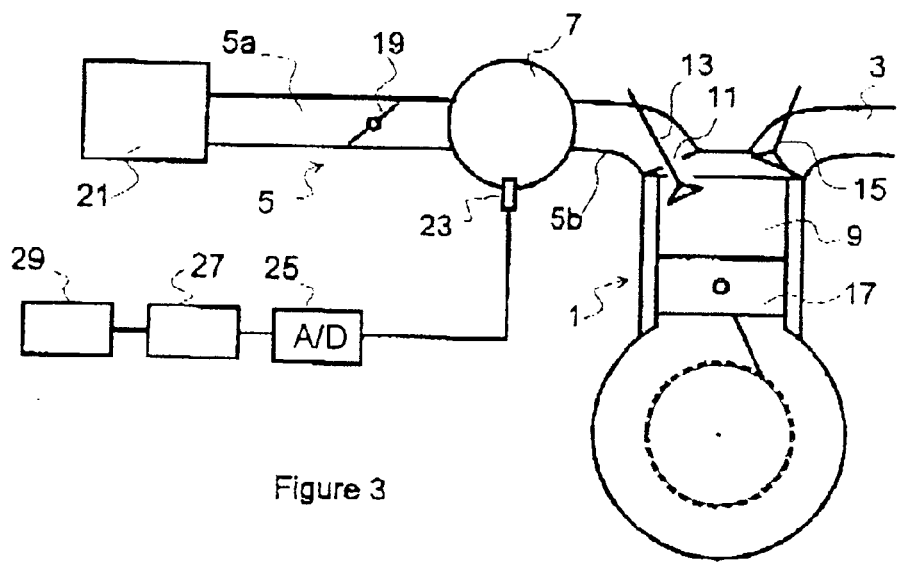
FIG. 3 schematically shows a cylinder of a gasoline engine with, in particular, an inlet manifold, a cylinder and an exhaust manifold.

FIG. 3 shows the way in which this effect is implemented.

In this figure, reference 1 schematically denotes a cylinder 1 of the aforesaid 125-cc engine, with an exhaust manifold 3 and an inlet manifold 5 for letting in the fluid needed for engine operation.

The inlet manifold 5 comprises a first part 5a and a second part 5b between which parts an "inlet plenum" 7 is interposed, through which plenum only air flows and which constitutes a chamber of larger cross section than the manifold portions 5a, 5b. The portion 5b is connected to the combustion chamber (or explosion chamber) 9 through the port 11 in which the inlet valve 13 is located. An exhaust valve 15 controls the passage between the chamber 9 and the exhaust manifold 3.

17 denotes the piston that moves in the cylinder 1.

The fuel inlet has not been depicted.

19 denotes the member that regulates the admission air flow rate (typically a pivot-mounted butterfly valve) arranged inside the manifold portion 5a upstream of the inlet plenum 7 (which could be omitted).

Further upstream still, the inlet manifold portion 5a is connected to the air filter depicted diagrammatically at 21.

At 23, an air pressure probe will allow pressure measurements to be taken at the plenum 7 on an operating series engine, to provide the correct air/fuel mixture "in real time" on the basis of, here, knowledge of the air flow rate MAF.

This will involve sampled pressure measurements, and this will preferably be done asynchronously with regards to the engine rotation cycle. Electronic filtering will preferably be used in conjunction with these measurements, so as to obtain averaged digital data.

The rate of acquisition of the measurements could, for example, be every four to five milliseconds.

Still in FIG. 3, there is meanwhile a diagrammatic representation at 25 of an analog/digital converter connected to the sensor 23 and, at 27, the digital filter that receives the converted data before transmitting them, once filtered, to a digital computer 29 designed in particular to determine the most appropriate air flow rate MAF and therefore to define the proper stoechiometric fuel/air ratio.

It will be noted that if asynchronous pressure measurements are taken, it will be possible to use a less sophisticated computer.

Thus, it will advantageously be air pressure MAP values averaged by electronic filtering that will be supplied to the computer in order to obtain the air flow rate MAF values.

For that, a low-pass filter with a time constant given as a function of at least one of the following parameters will advantageously be chosen:

variation in the rotational speed of the engine;

gradient of opening or closure of the regulating member 19;

engine acceleration.

Thus, if the pressure MAP value supplied at the output from the "sliding" digital filtering, that is to say filtering making it possible to obtain, at a filtering step of rank n, an averaged value that is a function of the results of step n−1 and replacing it, reaches or exceeds a determined value, it will then be the evolution law (2) below that will be taken into consideration in the computer to provide the flow rate MAF.

The model for this evolution law entered into the computer will preferably be as follows:

$$MAF = [(S_0 \times MAP^3) - (S_1 \times MAP^2) + (S_3 \times MAP)] \times N - Ofs(N), \text{ with:} \quad (2)$$

$S_0, S_1, S_3$: constants

Ofs (N): value of the air flow rate MAF at zero pressure MAP and at the engine speed N.

As has already been understood, this evolution law that takes account of the second and third power of the admission air pressure MAP was established after a campaign of bench tests on the same engine, or more generally an engine of the same series.

If a pressure MAP threshold, on the basis of which the computer is made to establish the air flow rate MAF to be employed, using not formula (1) but formula (2), needs to be determined, then this threshold will advantageously depend on an averaged value supplied at output of the digital filter 27.

In this respect, it must be noted that the pressure MAP is a continuous function that evolves with the position (openness) of the regulating member 19 and the rotational speed N of the engine.

To best take account of the evolution of this pressure in an operating engine, it is advised meanwhile that the aforementioned threshold value (defined of course during the initial bench test campaign) take account of:

said filtered averaged pressure values, and instantaneous admission pressure values measured more or less upon opening of the inlet valve inserted between the cylinder in question and the inlet manifold in question.

It will also be noted that taking account in this way of the evolution to the second and/or third power of the filtered pressure MAP, for various engine speeds N, makes it possible to provide engine setting data using a relatively unsophisticated computer, this being all the more true if this computer is made to take pressure MAP measurements in the plenum in the form of measurements sampled asynchronously with regards to the engine operating cycles.

What is claimed is:

1. A method for determining a setting for correct operation of an internal combustion engine or series of engines as a function of the air pressure in at least one inlet manifold (5, 7) of the engine, in which method:

a campaign of bench tests is carried out on the engine or on an engine of the series in order to establish a law governing the evolution of the air flow rate MAF entering a cylinder (1) of the engine connected to said inlet manifold, as a function of the admission pressure MAP taken from this inlet manifold, this being done for various engine speeds, then, on an operating series engine:
the air pressure in said engine inlet manifold (5, 7) is measured,
a corresponding air pressure MAP value is supplied to a computer (27) which is also supplied with the engine speed N corresponding to it,
and, from this, said air flow rate is deduced as a function of the established evolution law,
characterized in that:
for a series of engine speeds N in succession, and up to a certain pressure MAP value, said evolution law is established by modeling it using corresponding series of refined straight lines $$(a)\ y=ax-b, \text{with:} \qquad (a)$$

y=MAF
x=MAP
a=$a_1$×N ($a_1$ is a constant)
b=$a_2$×N ($a_2$ is a constant)
and, from a pressure MAP threshold onward, a corrected model is applied to take account of a difference between the actual value of the flow rate MAF and its value according to the model (a), beyond the threshold, to do that replacing b with b', with:

$$b'=f(N,\ MAP^2,\ MAP^3)+a_3 \times N$$

so that the evolution in the flow rate MAF becomes a function not only of the engine speed N but also of the evolution to the second and third power of the pressure MAP.

2. The method as claimed in claim 1, characterized in that:
said law governing the evolution of the air flow rate as a function of the pressure in the inlet manifold (5, 7) is established by considering that:

$$MAF-S_1 \times MAP-Ofs\ (N)$$

with MAF: air flow rate of the air entering the cylinder,
$S_1$: constant,
N: engine speed,
MAP: air pressure in the inlet manifold connected to the cylinder in question,
Ofs (N): value, at a given engine speed N, of the flow rate MAF at zero pressure MAP,
and, at least for said certain pressure MAP values, a correction is introduced into the value of the flow rate MAF using the corrected model so as to take account of a difference there is between the actual value of the flow rate MAF, at a determined value of the pressure MAP and a given engine speed N, and that supplied by said established evolution law, this correction being determined from measurements made during the bench test.

3. The method as claimed in claim 1, characterized in that, at least for said certain pressure MAP values, the computer (27) is supplied, by way of corrected model, with the model established according to the law:

$$MAF=[(S_0 \times MAP^3)-(S_1 \times MAP^2)+(S_3 \times MAP)] \times N - Ofs\ (N), \text{with:}$$

$S_0$, $S_1$, $S_3$: constants,
Ofs (N): value of the air flow rate MAF, at zero pressure MAP and at the engine speed N.

4. The method as claimed in claim 1, characterized in that the corrected modeling is applied when $$\frac{V_c}{C} < 1$$

with $V_c$: volume of the inlet manifold (5) or the plenum (7) of this manifold, where the pressure MAP measurements are taken,
C: cylinder capacity of the engine.

5. The method as claimed in claim 1, characterized in that the corrected modeling is applied when $$\frac{V_c \times N_c}{C} < 3.5$$

with $V_c$: volume of the inlet manifold (5) or of the plenum (7) of this manifold, where the pressure MAP measurements are taken,
$N_c$: number of engine cylinders,
C: cylinder capacity of the engine.

6. The method as claimed in claim 1, characterized in that the computer is supplied a pressure MAP that has been measured in the (one of the) inlet manifold(s) (5, 7) by a pressure sensor and that is then passed through a digital filter (27) supplying an averaged pressure value.

7. The method as claimed in claim 6, characterized in that, in order to determine said at least certain pressure MAP values to which the corrected model applies, an admission pressure value is defined beyond which the corrected model applies, taking account of the following:
said filtered averaged pressure values,
and instantaneous admission air pressure values measured more or less upon opening of the inlet valve (13) inserted between the cylinder in question and the inlet manifold in question.

8. A computer installed in an internal combustion engine to determine a setting for correct operation of this internal combustion engine or series of engines, characterized in that:
for a series of engine speeds N in succession, and up to a certain pressure MAP value, there is established in the computer the law governing the evolution of the air flow rate MAF of the air entering a cylinder (1) of the engine connected to an inlet manifold (5, 7) through which at least air passes, as a function of the air pressure MAP taken from said inlet manifold, by modeling it with a corresponding series of refined straight lines $$y=ax-b, \text{with:} \qquad (a)$$

y=MAF
x=MAP
a=$a_1$×N ($a_1$ is a constant)
b=$a_2$×N ($a_2$ is a constant)
and, from a pressure MAP threshold onward, a corrected model is applied to take account of a difference between the actual value of the flow rate MAF and its value according to the model (a), beyond the threshold, to do that replacing b with b', with:

$$b'=f(N,\ MAP^2,\ MAP^3)+a_3 \times N$$

so that the evolution in the flow rate MAF becomes a function not only of the engine speed N but also of the evolution to the second and third power of the pressure MAP.

9. A method for determining a setting for correct operation of an internal combustion engine as a function of fresh air pressure in an inlet manifold of the engine, comprises the steps of:

referencing a determined law defining, for plural engine speeds, an evolution of a fresh air flow rate MAF entering a cylinder of the engine connected to the inlet manifold, the air flow rate MAF being expressed as a function of an admission pressure MAP taken from the inlet manifold;

on an operating series engine, measuring the air pressure in the engine inlet manifold to develop a corresponding air pressure MAP value for each of the plural engine speeds; and deducing fresh air flow rate from a series of engine speeds N in succession, and up to a certain pressure MAP value, wherein, the determined law is established by using a corresponding series of refined straight lines $$y=ax-b, \text{with:} \quad (a)$$

y=MAF
x=MAP
$a=a_1 \times N$ ($a_1$ is a constant)
$b=a_2 \times N$ ($a_2$ is a constant)

and, from a pressure MAP threshold onward, a corrected model is applied to take account of a difference between the actual value of the flow rate MAF and the value according to the model (a), beyond the pressure MAP threshold, by replacing b with b', $$b'=f(N, MAP^2, MAP^3)+a_3 \times N$$

so that the evolution in the flow rate MAF becomes a function not only of the engine speed N but also of the evolution to the second and third power of the pressure MAP.

10. The method as claimed in claim 9, wherein, the determined law governing the evolution of the air flow rate as a function of the pressure in the inlet manifold (5, 7) is established by considering that:

$$MAF=S_1 \times MAP-Ofs\ (N)$$

with MAF: air flow rate of the air entering the cylinder,
$S_1$: constant,
N: engine speed,
MAP: air pressure in the inlet manifold connected to the cylinder in question,
Ofs (N): value, at a given engine speed N, of the flow rate MAF at zero pressure MAP, and, at least for said certain pressure MAP values, a correction is introduced into the value of the flow rate MAF using the corrected model so as to take account of a difference there is between the actual value of the flow rate MAF, at a determined value of the pressure MAP and a given engine speed N, and that supplied by said determined law, this correction being determined from measurements made during the bench test.

11. The method as claimed in claim 9, wherein, at least for said certain pressure MAP values, the corrected model is established according to the law:

$$MAF=\times[(S_0 \times MAP^3)-(S_1 \times MAP^2)+(S_3 \times MAP)] \times N-Ofs\ (N), \text{with:}$$

$S_0$, $S_1$, $S_3$: constants,
Ofs (N): value of the air flow rate MAF, at zero pressure MAP and at the engine speed N.

12. The method as claimed in claim 9, wherein, the corrected model is applied when $$\frac{V_c}{C} < 1$$

with $V_c$: volume of the inlet manifold (5) or the plenum (7) of this manifold, where the pressure MAP measurements are taken,
C: cylinder capacity of the engine.

13. The method as claimed in claim 9, wherein, the corrected model is applied when $$\frac{V_c \times N_c}{C} < 3.5$$

with $V_c$: volume of the inlet manifold (5) or of the plenum (7) of this manifold, where the pressure MAP measurements are taken,
$N_c$: number of engine cylinders,
C: cylinder capacity of the engine.

14. The method as claimed in claim 9, wherein, a pressure MAP that has been measured in the inlet manifold (5, 7) by a pressure sensor, and
the pressure MAP is passed through a digital filter (27) to supply an averaged pressure value.

15. The method as claimed in claim 14, wherein, in order to determine said at least certain pressure MAP values to which the corrected model applies, an admission pressure value is defined beyond which the corrected model applies, taking account of the following:

said filtered averaged pressure value, and
instantaneous admission air pressure values measured upon opening of an inlet valve (13) inserted between the cylinder and the inlet manifold.

* * * * *